United States Patent [19]
Glover

[11] Patent Number: 5,892,872
[45] Date of Patent: Apr. 6, 1999

[54] NETWORK UNIT ENCLOSURE

[75] Inventor: Richard J. Glover, Ottawa, Canada

[73] Assignee: Northern Telecom Limited, Montreal, Canada

[21] Appl. No.: 896,097

[22] Filed: Jul. 17, 1997

[51] Int. Cl.[6] .................................................. G02B 6/46
[52] U.S. Cl. .............................. 385/94; 385/92; 385/134; 361/388; 361/816
[58] Field of Search ............................... 385/92, 94, 134, 385/135; 361/388, 816

[56]           References Cited

U.S. PATENT DOCUMENTS

| | | | |
|---|---|---|---|
| 4,763,225 | 8/1988 | Frenkel et al. | 361/388 |
| 5,504,659 | 4/1996 | Acatay et al. | 361/816 |
| 5,608,609 | 3/1997 | Morrell | 361/690 |

*Primary Examiner*—John D. Lee
*Assistant Examiner*—Juliana K. Kang
*Attorney, Agent, or Firm*—R. J. Austin; Angela C. de Wilton

[57]           ABSTRACT

A network unit enclosure adapted for exposure to humidity and airborne contaminants defines a sealed first chamber and an adjacent second chamber. The two chambers are sealingly separated by a circuitry substrate on which electronic components are mounted in the first chamber and through which conductor connection means in the second chamber are connected to electronic components in the first chamber. An outer wall bordering the second chamber includes a hole for providing an electrical cable feedthrough. The enclosure may also define a third chamber, and a wall separating the first and third chamber including a sealed feedthrough for an optical fiber segment connected at one end to an optoelectronic component in the first chamber and the other end for connection to an optical fiber from an optical cable passed through an access hole in an outer wall bordering the third chamber.

21 Claims, 1 Drawing Sheet

NETWORK UNIT ENCLOSURE

FIELD OF THE INVENTION

This invention relates to network units enclosures, and in particular to those adapted for exposure to humidity and airborne contaminants.

BACKGROUND OF THE INVENTION

Modern telecommunication networks often comprise twisted pair, coaxial, or fiber optic lines terminated by a network unit for converting between signals used in different segments of the network. For example, a distribution network might be terminated by a network unit for converting between signals on a distribution line and signals on a subscriber line. In some applications, such network units may provide an interface for a single subscriber, such as in a fiber-to-the-home application, or provide an interface for a plurality of subscribers, such as in fiber-to-the-curb application. A network unit ordinarily comprises electronic components such as analog components, opto-electronic components, and signal processing components mounted on a circuitry substrate.

In typical applications, a network unit is packaged in a network unit enclosure adapted for use in locations where it may be exposed to environmental conditions. In some applications, the network unit enclosure may be mounted on a telephone pole, on an outside wall of a house, or partially sheltered from the elements in a ventilated cabinet on the ground. When placed in such location, the network unit enclosure may be exposed to environmental conditions, particularly to humidity and airborne contaminants such as spores and salt, which require the use of an enclosure with special structural features to avoid the possible deleterious effects of such environmental conditions on the components of the unit. The presence of a high level of humidity and contaminants can cause many known problems such as signal leakage, corrosion, mildew, and dendritic growth of conductor material. These problems can have deleterious effects on electronic components of a network unit and be the cause of intermittent or permanent failure of the network unit, resulting in loss of service to subscribers and expenditures in repair or replacement of the network unit. In network units comprising opto-electronic components, humidity and contaminants may also cause a deterioration of optical signals, in particular when less expensive opto-electronic components in non-hermetically sealed packages are used.

A known approach for avoiding the problems caused by humidity and contaminants in a network unit is to provide a hermetically sealed unit enclosure using a metal box sealed in a dry atmosphere using a cover soldered or welded along a periphery and using hermetically sealed bulkhead connectors for input and output signals, and for providing power to the unit. While such a construction may be highly effective in ensuring the absence of humidity within the unit enclosure, the cost of the hermetically sealed bulkhead connectors and the cost of assembling a unit with a soldered or welded cover may be prohibitive in many cost sensitive applications. In optical network units, the use of an optical connector may also involve a degradation of optical signal power due to imperfect alignment of optical conductors or to the presence of contaminants at the interface between optical conductors.

Accordingly, the present invention seeks to provide a network unit enclosure which is adapted for exposure to humidity and airborne contaminants and which may contribute in providing an advantageously cost-effective network implementation.

SUMMARY OF THE INVENTION

According to one aspect of the present invention, there is provided a network unit enclosure defining a sealed first chamber and an adjacent second chamber, the enclosure including a circuitry substrate which sealingly separates the two chambers, wherein the first chamber houses electronic components mounted on the circuitry substrate, the second chamber houses conductor connection means electrically connected to electronic components in the first chamber through the circuitry substrate, and the enclosure has an outer wall bordering the second chamber, the outer wall defining an access hole for passage of an electrical cable into the second chamber.

Such an enclosure may provide an adequate protection from humidity and airborne contaminants to the components in the sealed first chamber while providing a separate second chamber for connecting conductors carrying signals or power to electronic components of the unit. Advantageously, using the circuitry substrate both as a partition wall separating the first and second chambers and for mounting electronic components of the network unit thereon in the first chamber provides a cost-effective reduction in parts. Furthermore, by electrically connecting the conductor connection means in the second chamber to components in the first chamber by means of soldered through holes in the circuitry substrate, the use of costly sealed bulkhead connectors can be avoided.

In a preferred arrangement, particularly suited for unsheltered use, the first chamber is isolated from the outside atmosphere except through the access hole, whereby sealing the access hole effectively seals the second chamber from the outside atmosphere, thereby preventing the intrusion of rain and contaminants which could have deleterious effects on the conductor connection means and on the surface of the circuitry substrate in the first chamber.

In another preferred arrangement, for network units interfacing with optical signals, the network unit further defines a third chamber adjacent to said first chamber, wherein an outer wall of the enclosure bordering the third chamber includes a hole for passage of an optical cable into the third chamber, the enclosure also including a partition wall separating the first and third chamber, the partition wall including a sealed optical fiber feedthrough, and an optical fiber segment extends through the feedthrough with one end of the segment connected to an opto-electronic component in the first chamber and the other end located in the third chamber for connection to an optical fiber from the optical cable. A third chamber of the network unit enclosure can, in this way, be provided for optical connections, thereby protecting a fragile optical fiber, after installation of the unit, from damage that could occur, for example, when connecting or disconnecting conductors in the second chamber of the unit. By including a desiccant within the first chamber, the dryness of the first chamber may be ensured, further protecting the components in the first chamber from humidity and allowing the use of lower-cost opto-electronic components which are not hermetically sealed.

Advantageously, by mounting the opto-electronic component on a wall of the first chamber other than the circuitry substrate, movement of the portion of the optical fiber segment from the sealed optical fiber feedthrough to the opto-electronic component may be prevented should the substrate be removed. This significantly reduces the risk of damaging the fragile optical fiber when the circuitry substrate is manipulated, for example when repairing the unit.

According to another aspect of the invention, there is provided a network unit enclosure comprising a first enclosure member and a circuitry substrate sealingly mounted to the first enclosure member to seal an opening in the first enclosure member and provide a sealed first chamber within the first enclosure member, the first chamber housing a plurality of electronic components and an opto-electronic component; a second enclosure member sealingly connected to the first enclosure member along a sealing path extending around the circuitry substrate to define a second chamber with the circuitry substrate separating the first and second chambers, with the second chamber housing connection means electrically connected to the components in the first chamber and with a first access hole provided to the second chamber for sealing reception therethrough of an electrical cable and into the second chamber so as to seal the second chamber; a third enclosure member sealingly connected to the first enclosure member to define a third chamber bordered by the first and third enclosure members with the first chamber disposed between the second and third chambers, the third enclosure member providing a second access hole for sealing reception therethrough of an optical cable and into the third chamber; and an optical transmission element connected to the opto-electronic component in the first chamber and extending in sealing reception through a third access hole, in the first enclosure member, for connection in the third chamber to a transmission element of the optical cable. A network unit enclosure with such a structure may be particularly suited for a cost effective implementation of an optical network unit which is adapted for exposure to rain, humidity and airborne contaminants.

BRIEF DESCRIPTION OF THE DRAWINGS

A preferred embodiment of the invention will now be described, by way of example, with reference to the accompanying drawing in which.

DESCRIPTION OF THE PREFERRED EMBODIMENTS

Figure 1:
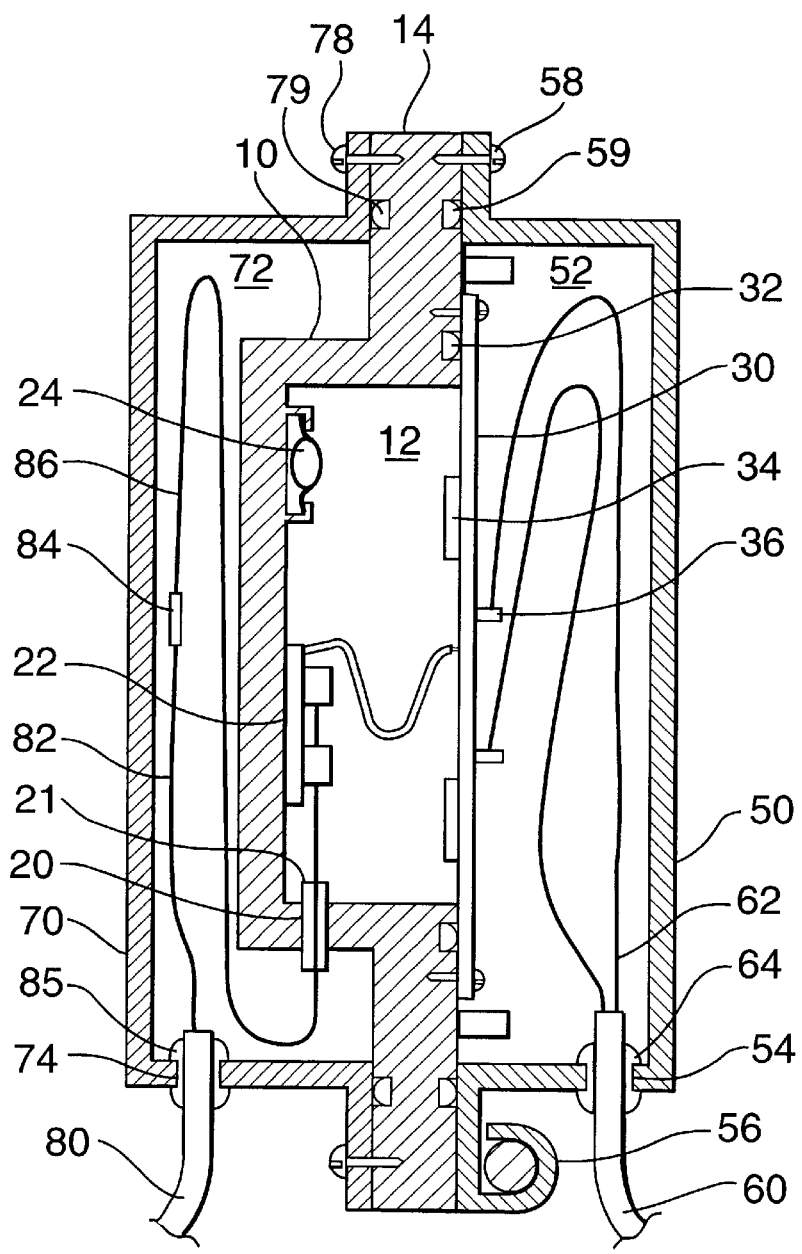
FIG. 1 is a cross-sectional view through a network unit enclosure according to the preferred embodiment.

In the preferred embodiment as shown by FIG. 1, the network unit enclosure comprises a first enclosure member in the form of a metallic opensided central box member 10 and a planar circuitry substrate 30 closing the open side of the central box member, thereby defining a first chamber 12. The circuitry substrate is secured by screws to an outward flange 14 of the central box member and sealingly closes the open side of the central box member by compression of an elastomeric seal 32 along a contour surrounding the opening. Electronic components 34 are mounted on the circuitry substrate 30 in the sealed first chamber 12, and are thereby protected from the deleterious effects of humidity and airborne contaminants of an outside environment.

A second enclosure member in the form of a metallic first cover member 50, also shaped as an opensided box, is mounted on the flange 14 of the central box member around the circuitry substrate 30, thereby defining a second chamber 52 which is sealingly separated from the first chamber 12 by the circuitry substrate 30. In this way, the substrate serves both as a partition wall, sealingly separating the first and second chambers, and as a circuitry substrate, thus contributing to a cost-efficient reduction in the number of parts.

Figure 1A:
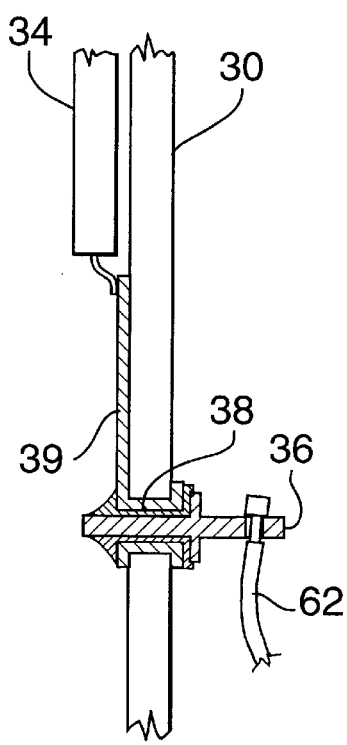
FIG. 1A is an enlarged view of a portion of the network unit enclosure of FIG. 1.

A subscriber line cable 60 is passed through an access hole 54 in the first cover member and into the second chamber 52. Wires 62 from the subscriber cable 60 are connected to conductor connection means in the form of insulation-displacement connectors 36 mounted on the circuitry substrate 30 in the second chamber of the enclosure. As shown in FIG. 1A, electrical terminals of connectors 36 are soldered in holes 38 of the circuitry substrate 30 to provide connections through the circuitry substrate to components 34 mounted on the opposite side of the circuitry substrate via copper traces 39 of the circuitry substrate. The connection by terminals soldered in holes in the circuitry substrate provides a cost-effective way to pass signals between the first and second chambers without compromising the seal of the first chamber and avoiding the use of costly sealed bulkhead connectors. Alternatively, but not shown, other types of connectors may be mounted on a bracket attached to the flange 14 in the second chamber 52 and connected by wires soldered in holes 38 of the circuitry substrate. This may be recommended for connectors requiring higher insertion forces to avoid possible damage from mechanical stress on the substrate. When using connectors involving low forces, mounting the connectors directly onto the circuitry substrate cost-effectively avoids the use of bracket parts.

The first cover member 50 is mounted on a hinge 56 and normally held closed by screws 58 and sealed by compression of an elastomeric interfacial seal 59 on a contour surrounding the circuitry substrate. Using the hinged first cover 50 conveniently allows access to the connectors 36 while keeping the first cover member attached to the rest of the enclosure when opened during installation or servicing. A rubber gasket 64 seals the access hole 54 around the cable 60, keeping the second chamber sealed from the outside environment, thereby preventing the intrusion of rainwater and airborne contaminants which could have deleterious effects on the connectors 36 and on the surface of the circuitry substrate 30 within the second chamber 52. To further protect the connectors and the surface of the circuitry substrate in the second chamber from humidity and contaminants which may enter the second chamber 52 when the first cover member 50 of the enclosure is opened, a grease is applied to the connectors 36 and to the surface of the circuitry substrate 30 in the second chamber 52. Application of grease may also provide some protection to these structures should the second chamber 12 be imperfectly sealed, or should the second chamber be not sealed and provided with ventilation apertures in the first cover (not shown), particularly if the unit is accidentally flooded for a short period of time.

On another side of the enclosure, a third enclosure member in the form of a metallic second cover member 70, also shaped as an opensided box, is secured by screws 78 to flange 14 of the central box member, on the opposite side to which the first cover member 50 is mounted. A third chamber 72, adjacent to the first chamber 10, is thereby defined by the second cover member 70 and the central box member 10. The cover 70 includes a second access hole 74 through which an optical distribution cable 80 is passed into the third chamber 72. By providing a separate third chamber to receive an optical fiber 82 from the optical distribution cable, the fragile optical fiber can be protected from possible damage when the unit is manipulated to install or modify connections in the second chamber.

In the third chamber 72, the optical fiber 82 from the optical distribution cable 80 is connected through a splice 84 to an optical fiber segment 86. The optical fiber segment 86 is passed through a sealed optical fiber feedthrough 20 and terminates at an opto-electronic component 22 mounted on the central box member 10, inside the first chamber 12. The sealed optical fiber feedthrough 20 is provided using a known method, as described in U.S. Pat. No. 4,413,881 to Kovats, assigned to the assignee of the present invention and incorporated herein by reference, which includes a mass of fusible alloy embracing a length of the optical fiber segment 86 within a metallic tube 21 sealingly soldered through a hole in the central box member 10, thereby providing a reliable seal to the first chamber 12 and allowing the removal and replacement of the optical fiber segment by desoldering the metallic tube 21. Alternatively, but not shown, the sealed optical fiber feedthrough may be provided by other known methods such as by sealing the optical fiber segment in the feedthrough using epoxy or by metallizing the optical fiber and soldering it in the feedthrough.

By mounting the opto-electronic component 22 on the central box member 10, inside the first chamber 12, movement of the portion of the optical fiber segment from the sealed optical fiber feedthrough 20 to the opto-electronic component 22 may be prevented should the circuitry substrate 30 be removed. Also, metallic central box member 10 may thus act as a heat-sink conducting heat away from the opto-electronic component 22 mounted thereon. The second cover member 70 compresses an interfacial elastomeric seal 79 along the flange 14 and the second access hole 74 is sealed by a rubber gasket 85. In this way, the third chamber 72 is also sealed from the outside atmosphere, preventing rain and airborne contaminants from soiling inside the third chamber. Alternatively, but not shown, the second cover member may also be hinged, although, in many applications, the cost of providing this feature may not be justified if the second cover is unlikely to be opened after installation.

A desiccant in the form of a pouch 24 containing desiccant granules is mounted on the central box member 10 inside the first chamber 12, providing a dry first chamber without the need for sealing the first chamber in a dry atmosphere during manufacturing, and also protecting against a slow intrusion of humidity through imperfect seals which could occur over a period of use. Controlling the absolute humidity inside the first chamber allows the use of less costly opto-electronic components which are not hermetically packaged.

Although a particular embodiment of the invention has been described in detail, it should be appreciated that numerous modifications and variations may be made without departing from the scope of the invention as defined in the claims.

What is claimed is:

1. A network unit enclosure adapted for exposure to rain, humidity, and airborne contaminants defining a sealed first chamber and an adjacent second chamber, the enclosure including a circuitry substrate which sealingly separates the two chambers, the second chamber sealingly connected to the first chamber along a sealing path extending around the circuitry substrate, wherein the first chamber houses electronic components mounted on the circuitry substrate, the second chamber houses conductor connection means electrically connected to electronic components in the first chamber through the circuitry substrate, and the enclosure has an outer wall bordering the second chamber, the outer wall defining an access hole for passage of an electrical cable into the second chamber.

2. A network unit enclosure according to claim 1, wherein said conductor connection means is electrically connected to electronic components in said first chamber by means of soldered-through holes in said circuitry substrate.

3. A network unit enclosure according to claim 1, wherein said conductor connection means is mounted on said circuitry substrate.

4. A network unit enclosure according to claim 1, wherein said second chamber defined by the enclosure is isolated from an outside atmosphere except through said access hole, whereby sealing the access hole effectively seals the second chamber from the outside atmosphere.

5. A network unit enclosure according to claim 1, wherein the network unit comprises an elastomeric compression seal to the first chamber in compressive contact with a peripheral contour on a planar surface of said circuitry substrate.

6. A network unit enclosure according to claim 1 wherein said second chamber includes a hinged cover which permits access to said conductor connection means.

7. A network unit enclosure according to claim 1, wherein a grease is applied in said second chamber to said circuitry substrate and said conductor connection means.

8. A network unit enclosure according to claim 1, wherein said first chamber comprises a desiccant.

9. A network unit enclosure according to claim 1, further defining a third chamber adjacent to said first chamber, wherein an outer wall of the enclosure bordering the third chamber includes a hole for passage of an optical cable into the third chamber, the enclosure also including a partition wall separating the first and third chamber, the partition wall including a sealed optical fiber feedthrough, and an optical fiber segment extends through the feedthrough with one end of the segment connected to an opto-electronic component in the first chamber and the other end located in the third chamber for connection to an optical fiber from the optical cable.

10. A network unit enclosure according to claim 9, wherein said third chamber defined by the enclosure is isolated from an outside atmosphere except through said hole for passage of an optical cable, whereby sealing the hole for passage of an optical cable effectively seals the third chamber from the outside atmosphere.

11. A network unit enclosure according to claim 9, wherein said opto-electronic component is mounted on said wall separating said first chamber and said third chamber.

12. A network unit enclosure according to claim 9, wherein said sealed optical fiber feedthrough comprises a mass of fusible alloy embracing a length of said optical fiber segment within a metallic tube sealingly soldered through a hole in said partition wall.

13. A network unit enclosure comprising:

first enclosure member and a circuitry substrate sealingly mounted to the first enclosure member to seal an opening in the first enclosure member and provide a sealed first chamber within the first enclosure member, the first chamber housing a plurality of electronic components and an opto-electronic component;

a second enclosure member sealingly connected to the first enclosure member along a sealing path extending around the circuitry substrate to define a second chamber with the circuitry substrate separating the first and second chambers, with the second chamber housing connection means electrically connected to the components in the first chamber and with a first access hole provided to the second chamber for sealing reception therethrough of an electrical cable and into the second chamber so as to seal the second chamber;

a third enclosure member sealingly connected to the first enclosure member to define a third chamber bordered by the first and third enclosure members with the first chamber disposed between the second and third chambers, the third enclosure member providing a second access hole for sealing reception therethrough of an optical cable and into the third chamber; and an optical transmission element connected to the opto-electronic component in the first chamber and extending in sealing reception through a third access hole, in the first enclosure member, for connection in the third chamber to a transmission element of the optical cable.

14. A network unit enclosure defining a sealed first chamber and an adjacent second chamber, the enclosure including a circuitry substrate which sealingly separates the two chambers, an elastomeric compression seal in compressive contact with a peripheral contour of said circuitry substrate and the first chamber, wherein the first chamber houses electronic components mounted on the circuitry substrate, the second chamber houses conductor connection means electrically connected to electronic components in the first chamber through the circuitry substrate, and the enclosure has an outer wall bordering the second chamber, the outer wall defining an access hole for passage of an electrical cable into the second chamber.

15. A network unit enclosure defining a sealed first chamber and an adjacent second chamber, the enclosure including a circuitry substrate which sealingly separates the two chambers, wherein the first chamber houses electronic components mounted on the circuitry substrate, the second chamber houses conductor connection means electrically connected to electronic components in the first chamber through the circuitry substrate, and the enclosure has an outer wall bordering the second chamber, the outer wall defining an access hole for passage of an electrical cable into the second chamber, and the second chamber including a hinged cover which permits access to said conductor connection means.

16. A network unit enclosure defining a sealed first chamber and an adjacent second chamber, the enclosure including a circuitry substrate which sealingly separates the two chambers, wherein the first chamber houses electronic components mounted on the circuitry substrate, the second chamber houses conductor connection means electrically connected to electronic components in the first chamber through the circuitry substrate, and the enclosure has an outer wall bordering the second chamber, the outer wall defining an access hole for passage of an electrical cable into the second chamber, wherein a grease is applied in said second chamber to said circuitry substrate and said conductor connection means.

17. A network unit enclosure defining a sealed first chamber and an adjacent second chamber, the enclosure including a circuitry substrate which sealingly separates the two chambers, the first chamber comprising a desiccant, wherein the first chamber houses electronic components mounted on the circuitry substrate, the second chamber houses conductor connection means electrically connected to electronic components in the first chamber through the circuitry substrate, and the enclosure has an outer wall bordering the second chamber, the outer wall defining an access hole for passage of an electrical cable into the second chamber.

18. A network unit enclosure defining a sealed first chamber and an adjacent second chamber, the enclosure including a circuitry substrate which sealingly separates the two chambers, wherein the first chamber houses electronic components mounted on the circuitry substrate, the second chamber houses conductor connection means electrically connected to electronic components in the first chamber through the circuitry substrate, and the enclosure has an outer wall bordering the second chamber, the outer wall defining an access hole for passage of an electrical cable into the second chamber, the enclosure further defining a third chamber adjacent to said first chamber, wherein an outer wall of the enclosure bordering the third chamber includes a hole for passage of an optical cable into the third chamber, the enclosure also including a partition wall separating the first and third chamber, the partition wall including a sealed optical fiber feedthrough, and an optical fiber segment extends through the feedthrough with one end of the segment connected to an opto-electronic component in the first chamber and the other end located in the third chamber for connection to an optical fiber from the optical cable.

19. A network unit enclosure according to claim 18, wherein said third chamber defined by the enclosure is isolated from an outside atmosphere except through said hole for passage of an optical cable, whereby sealing the hole for passage of an optical cable effectively seals the third chamber from the outside atmosphere.

20. A network unit enclosure according to claim 18, wherein said opto-electronic component is mounted on said wall separating said first chamber and said third chamber.

21. A network unit enclosure according to claim 18 wherein said sealed optical fiber feedthrough comprises a mass of fusible alloy embracing a length of said optical fiber segment within a metallic tube sealingly soldered through a hole in said partition wall.

* * * * *